(12) United States Patent  
Ramanujam

(10) Patent No.: US 8,310,080 B2
(45) Date of Patent: Nov. 13, 2012

(54) YAW ASSEMBLY FOR USE IN WIND TURBINES

(75) Inventor: Saravanan Ramanujam, Hosur (IN)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 12/850,346

(22) Filed: Aug. 4, 2010

(65) Prior Publication Data

US 2011/0140439 A1 Jun. 16, 2011

(51) Int. Cl.
*F03D 9/00* (2006.01)
(52) U.S. Cl. .......................... 290/55; 290/44
(58) Field of Classification Search .......... 290/44, 290/55
See application file for complete search history.

(56) References Cited

U.S. PATENT DOCUMENTS

| | | | | |
|---|---|---|---|---|
| 4,311,435 A * | 1/1982 | Bergero | | 416/170 R |
| 4,692,094 A * | 9/1987 | Kulinyak | | 416/11 |
| 8,022,564 B2 * | 9/2011 | Nohara et al. | | 290/44 |
| 2007/0098549 A1 | 5/2007 | Nies | | |
| 2009/0068013 A1 | 3/2009 | Birkemose et al. | | |
| 2009/0250939 A1 * | 10/2009 | Curme | | 290/55 |
| 2010/0109327 A1 * | 5/2010 | Nielsen et al. | | 290/44 |
| 2010/0111665 A1 | 5/2010 | Daniels | | |
| 2010/0140948 A1 * | 6/2010 | Segovia et al. | | 290/55 |
| 2010/0144483 A1 | 6/2010 | Aiyakkannu | | |
| 2010/0230967 A1 * | 9/2010 | Heo | | 290/44 |
| 2011/0006541 A1 * | 1/2011 | Frederiksen | | 290/55 |

* cited by examiner

*Primary Examiner* — Tho D Ta
(74) *Attorney, Agent, or Firm* — James McGinness, Esq.; Armstrong Teasdale LLP

(57) ABSTRACT

A yaw assembly for use in a wind turbine. The yaw assembly includes a shaft coupled to a yaw drive assembly. The shaft extends outwardly from said yaw drive assembly. A pinion is operatively coupled to the shaft. A slip assembly is positioned between the pinion and the shaft. The slip assembly is configured to facilitate selectively rotating the pinion with respect to the shaft.

17 Claims, 7 Drawing Sheets

YAW ASSEMBLY FOR USE IN WIND TURBINES

BACKGROUND OF THE INVENTION

The embodiments described herein relate generally to a yaw assembly for use in wind turbines.

Because many known wind turbines provide electrical power to utility grids, at least some wind turbines have larger components (e.g., rotors in excess of thirty-meters in diameter) that facilitate supplying greater quantities of electrical power. However, the larger components are often subjected to increased loads (e.g., asymmetric loads) that result from wind shears, yaw misalignment, and/or turbulence. The increased loads have been known to contribute to significant fatigue cycles on the components of the wind turbine.

At least some known wind turbines include a nacelle fixed atop a tower. The nacelle includes a rotor assembly coupled to a generator through a shaft. In known rotor assemblies, a plurality of rotor blades extend from a rotor. The rotor blades are oriented such that wind passing over the rotor blades turns the rotor and rotates the shaft, thereby driving the generator to generate electricity. At least some known nacelles include a yaw system for controlling a perspective of the rotor relative to a direction of wind. Known yaw systems are configured to rotate the nacelle about a yaw axis to adjust the perspective of the rotor. Additionally, known yaw systems are configured to maintain a perspective of the rotor with respect to the wind direction. During operation, known wind turbines may be subjected to high velocity wind events that impart an increased rotational moment to the nacelle with respect to a normal wind turbine operation. Known yaw systems are sized to facilitate preventing a rotation of the nacelle during these high velocity wind events. As such, known yaw systems are oversized for normal wind turbine operation.

BRIEF DESCRIPTION OF THE INVENTION

In one aspect, a yaw assembly for use in a wind turbine is provided. The yaw assembly includes a shaft coupled to a yaw drive assembly. The shaft extends outwardly from said yaw drive assembly. A pinion is operatively coupled to the shaft. A slip assembly is positioned between the pinion and the shaft. The slip assembly is configured to facilitate selectively rotating the pinion with respect to the shaft.

In another aspect, a yaw system for use with a wind turbine is provided. The wind turbine includes a nacelle that is coupled to a tower. The yaw system includes a yaw bearing that is coupled between the nacelle and the tower. A yaw drive assembly is coupled to the nacelle. A shaft is coupled to the yaw drive assembly. The shaft extends outwardly from the yaw drive assembly. A pinion is operatively coupled to the shaft. The pinion is configured to engage the yaw bearing. A slip assembly is positioned between the pinion and the shaft. The slip assembly configured to selectively transfer a torque loading from the yaw drive assembly to the pinion.

In yet another aspect, a wind turbine system is provided. The wind turbine system includes a tower, a nacelle that is rotatably coupled to a tower, and a yaw bearing that is coupled between the nacelle and the tower. A yaw drive assembly is coupled to the nacelle. A shaft is coupled to the yaw drive assembly. The shaft extends outwardly from the yaw drive assembly. A pinion is operatively coupled to the shaft. The pinion is configured to engage the yaw bearing. A slip assembly is positioned between the pinion and the shaft. The slip assembly is configured to facilitate selectively rotating the pinion with respect to the shaft.

The embodiments described herein facilitate selectively adjusting a torque loading that is transferred between a nacelle and a yaw system. More specifically, the yaw assembly described herein includes a slip assembly that enables a yaw pinion to rotate relative to a yaw drive shaft when subjected to a torque loading that is greater than a predefined torque loading.

DETAILED DESCRIPTION OF THE INVENTION

The embodiments described herein include a wind turbine that includes a yaw system that selectively transfers a torque loading from a nacelle to the yaw system. More specifically, the yaw system described herein includes a slip assembly that enables an adjustment of the torque loading that is transferred between a yaw pinion and a yaw drive shaft, and enables the yaw pinion to rotate with respect to the yaw drive shaft when an operating torque loading exceeds a predefined torque loading. By limiting an amount of torque loading transferred between the yaw pinion and the yaw drive shaft, the size of the yaw system can be reduced.

Figure 1:
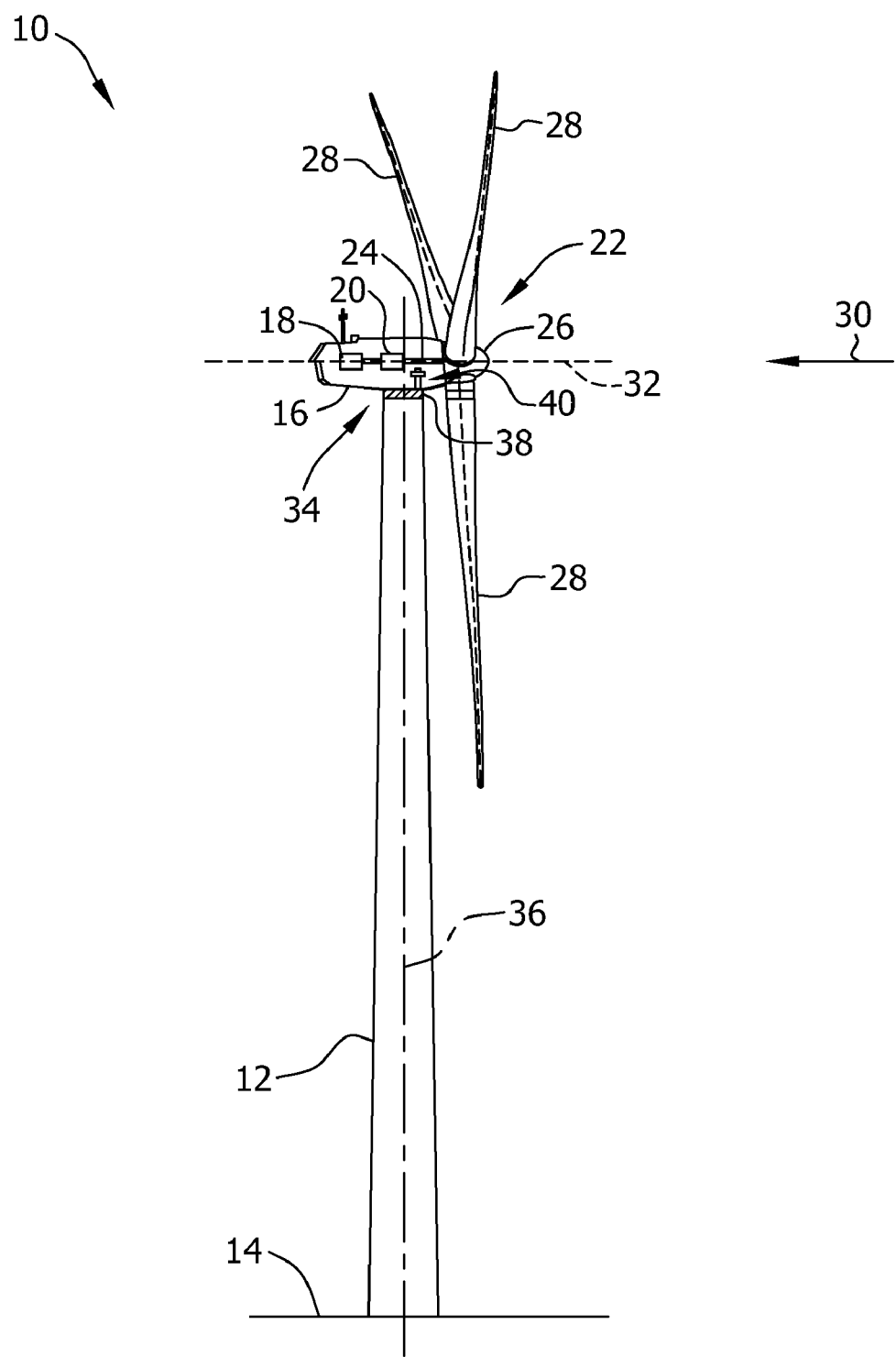
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, a generator 18 positioned within nacelle 16, and a gearbox 20 that is coupled to generator 18. A rotor 22 is rotatably coupled to gearbox 20 with a rotor shaft 24. Rotor 22 includes a rotatable hub 26 and at least one rotor blade 28 coupled to and extending outwardly from hub 26.

In the exemplary embodiment, rotor 22 includes three rotor blades 28. In an alternative embodiment, rotor 22 includes more or less than three rotor blades 28. In the exemplary embodiment, tower 12 is fabricated from tubular steel to define a cavity (not shown in FIG. 1) that extends between supporting surface 14 and nacelle 16. In an alternative embodiment, tower 12 is any suitable type of tower having any suitable height.

Rotor blades 28 are spaced about hub 26 to facilitate rotating rotor 22 to enable kinetic energy to be transferred from the wind into usable mechanical energy, and subsequently, electrical energy. In the exemplary embodiment, each rotor blade 28 has a length ranging from about 30 meters (m) (99 feet (ft)) to about 120 m (394 ft). Alternatively, rotor blades 28 may have any suitable length that enables wind turbine 10 to function as described herein. For example, other non-limiting examples of rotor blade lengths include 10 m or less, 20 m, 37 m, or a length that is greater than 120 m. As wind strikes rotor blades 28 from a direction 30, rotor 22 is rotated about an axis of rotation 32.

A yaw system 34 is coupled to nacelle 16 and to tower 12. Yaw system 34 is configured to rotate nacelle 16 and rotor 22 with respect to tower 12 about a yaw axis 36. Yaw system 34 includes a yaw bearing 38 and a yaw assembly 40. Yaw bearing 38 is coupled between nacelle 16 and tower 12 to facilitate rotating nacelle 16 with respect to tower 12. Yaw assembly 40 is coupled to nacelle 16 and to yaw bearing 38. Yaw system 34 is configured to selectively rotate nacelle 16 and rotor 22 about yaw axis 36 to control the perspective of rotor blades 28 with respect to wind direction 30.

Figure 2:
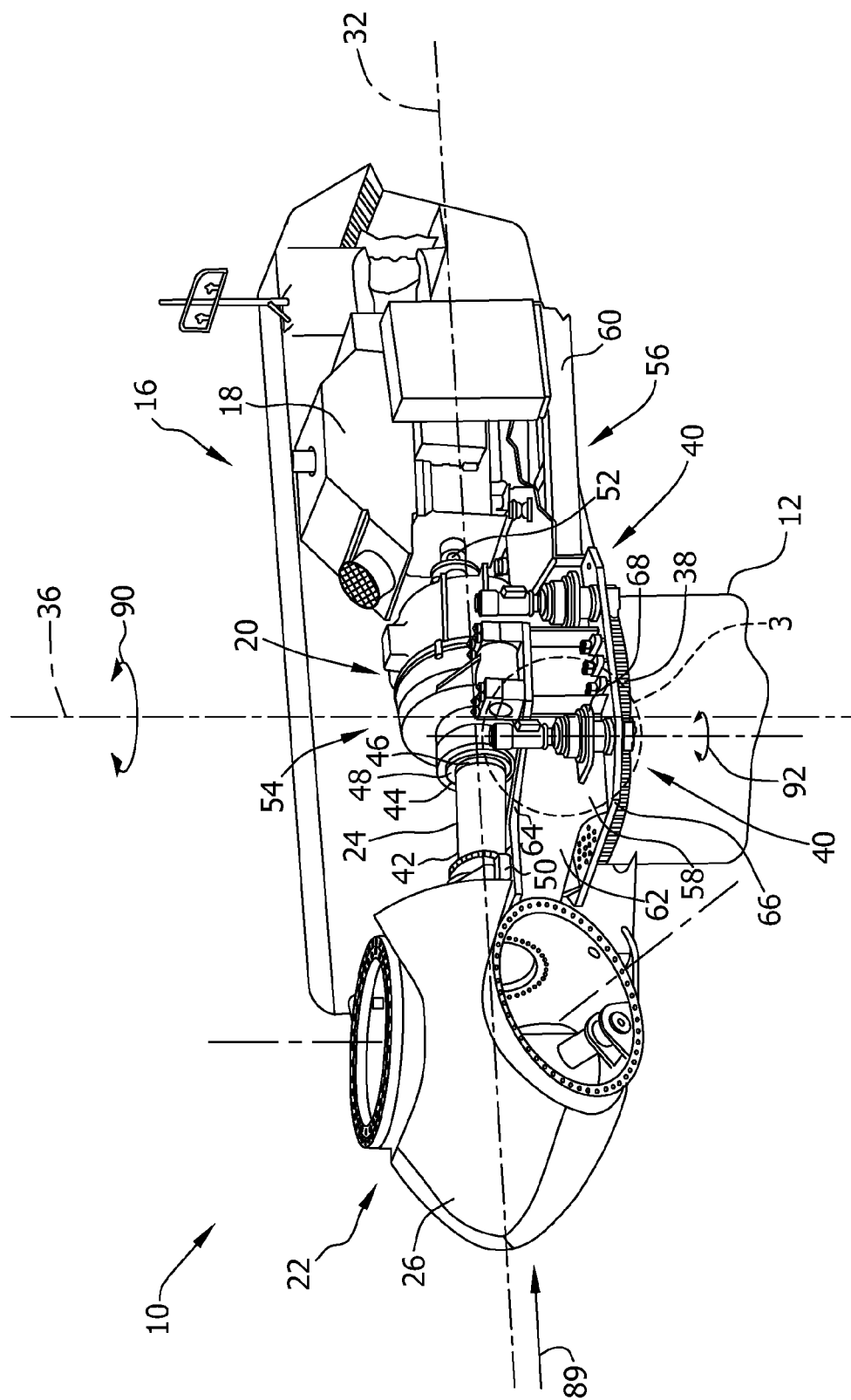
FIG. 2 is an enlarged perspective view of a portion of the wind turbine shown in FIG. 1 including an exemplary yaw assembly.
Figure 3:
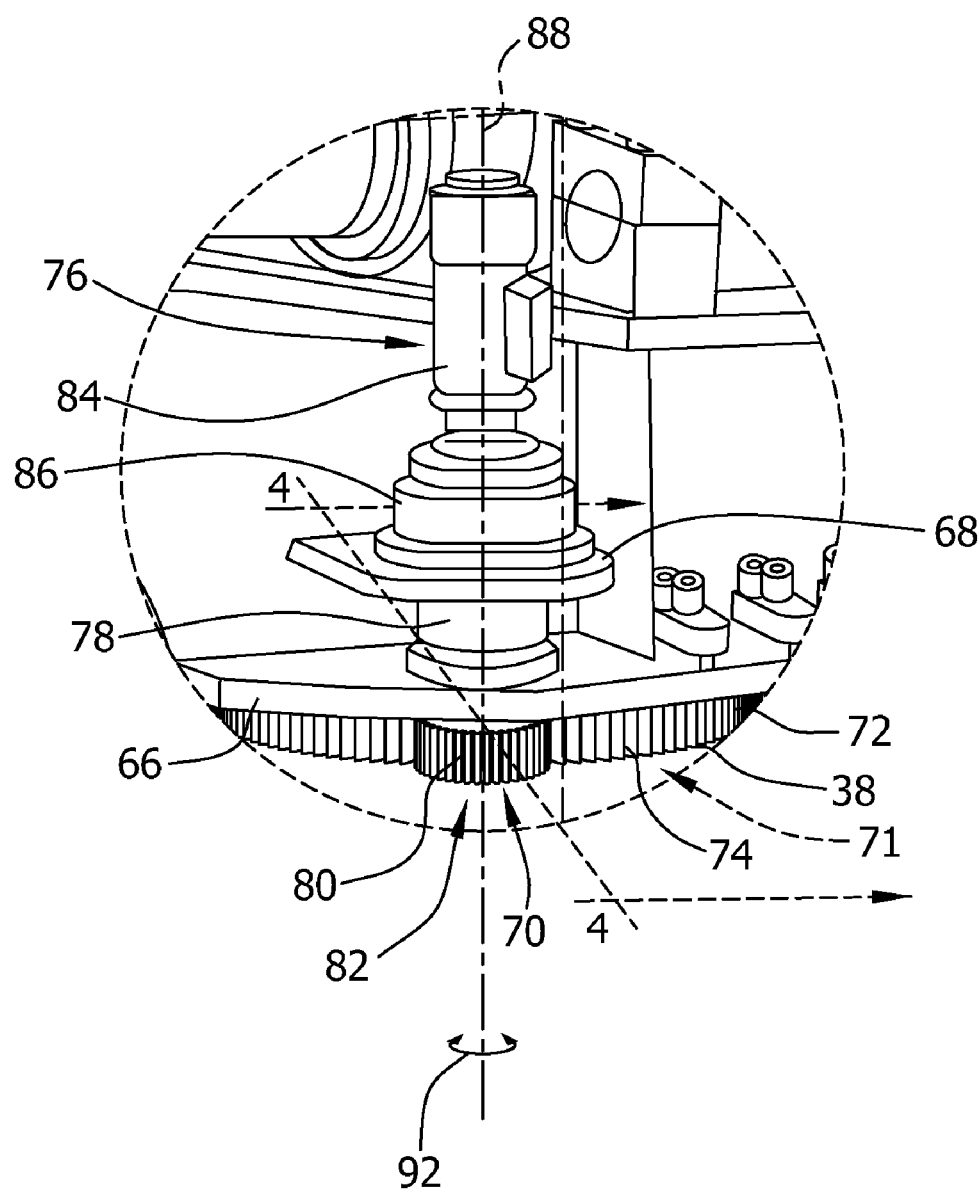
FIG. 3 is an enlarged perspective view of a portion of an exemplary yaw assembly shown in FIG. 2.

FIG. 2 is an enlarged perspective view of a portion of wind turbine 10. FIG. 3 is an enlarged perspective view of yaw assembly 40 shown in FIG. 2. Identical components shown in FIG. 3 are labeled with the same reference numbers used in FIG. 2. Various components of wind turbine 10 are housed in nacelle 16. In the exemplary embodiment, at least one yaw assembly 40 is coupled to nacelle 16 and to tower 12 for selectively rotating nacelle 16 with respect to tower 12 about yaw axis 36. In the exemplary embodiment, nacelle 16 includes rotor shaft 24 that is rotatably coupled between rotor 22 and gearbox 20. Rotor shaft 24 has a first end 42 and an opposite second end 44. First end 42 is coupled to hub 26 such that a rotation of hub 26 about axis 32 facilitates rotating rotor shaft 24 about axis 32. Second end 44 is coupled to gearbox 20. Gearbox 20 includes an input shaft 46 that is sized to receive second end 44. A shrink disk 48 is coupled to input shaft 46 and is configured to compress input shaft 46 about rotor shaft 24 to facilitate coupling input shaft 46 to rotor shaft 24 via a friction fit. A shaft support bearing 50 is coupled to first end 42 at or near hub 26 to facilitate radial support and alignment of rotor shaft 24.

A high speed shaft 52 is coupled between gearbox 20 and generator 18. During operation of wind turbine 10, a rotation of rotor shaft 24 rotatably drives gearbox 20 that subsequently drives high speed shaft 52. High speed shaft 52 rotatably drives generator 18 to facilitate production of electrical power by generator 18. Rotor shaft 24, generator 18, gearbox 20, high speed shaft 52, and/or shaft support bearing 50, are referred to as a drive train 54. In the exemplary embodiment, drive train 54 is supported by drive train support assembly 56. Drive train support assembly 56 includes a bedplate support frame 58 and a generator frame 60 that is cantilevered from bedplate support frame 58. Gearbox 20, rotor shaft 24, and shaft support bearing 50 are each supported by bedplate support frame 58. Generator 18 is supported by generator frame 60.

In the exemplary embodiment, yaw assembly 40 is coupled to bedplate support frame 58 to support yaw assembly 40 from bedplate support frame 58. Bedplate support frame 58 includes at least one sidewall 62 that extends between an upper support plate 64 and a lower support plate 66. A yaw support bracket 68 extends outwardly from sidewall 62 and is coupled to yaw assembly 40 to at least partially support yaw assembly 40 from sidewall 62. Lower support plate 66 defines an opening 70 sized to receive yaw assembly 40. Yaw assembly 40 is positioned within opening 70 and is coupled to lower support plate 66 to at least partially support yaw assembly 40 from lower support plate 66.

Yaw bearing 38 is coupled to bedplate support frame 58 and to tower 12. Yaw bearing 38 is configured to enable a rotation of nacelle 16 with respect to tower 12. In the exemplary embodiment, yaw bearing 38 includes an inner race 71 (not shown) that is rotatably coupled to an outer race 72 such that inner race 71 rotates relative to outer race 72 about yaw axis 36. Inner race 71 is coupled to bedplate support frame 58. Outer race 72 is securely coupled to tower 12, or integrated with tower 12. Outer race 72 includes a plurality of bearing teeth 74 spaced circumferentially about outer race 72. Bearing teeth 74 engage yaw assembly 40 such that an operation of yaw assembly 40 rotates inner race 71 with respect to outer race 72 and rotates nacelle 16 about yaw axis 36. Alternatively, outer race 72 may be coupled to bedplate support frame 58 and yaw assembly 40 may be configured to engage inner race 71 to rotate outer race 72 with respect to inner race 71.

In the exemplary embodiment, yaw assembly 40 includes a yaw drive system 76, a yaw drive shaft 78 that is rotatably coupled to yaw drive system 76, a yaw pinion 80 that is operatively coupled to yaw drive shaft 78, and a yaw slip assembly 82 that is coupled between yaw drive shaft 78 and yaw pinion 80. Yaw drive system 76 includes a yaw drive motor 84 that is coupled to a yaw gearbox 86. Yaw drive motor 84 is configured to impart a mechanical force to yaw gearbox 86, which in turn imparts a rotation force to yaw drive shaft 78. Yaw drive shaft 78 is coupled between yaw gearbox 86 and yaw pinion 80 such that yaw pinion 80 is rotated by yaw gearbox 86 about a yaw drive axis 88 defined by yaw drive shaft 78.

In the exemplary embodiment, yaw drive system 76 is coupled to yaw support bracket 68 for supporting yaw assembly 40 from bedplate support frame 58. Yaw drive shaft 78 extends through opening 70 such that at least a portion of yaw drive shaft 78 is positioned adjacent to yaw bearing 38. Yaw pinion 80 is coupled to yaw drive shaft 78 such that yaw pinion 80 is in contact with yaw bearing 38. More specifically, yaw pinion 80 is configured to engage bearing teeth 74 such that a rotation of yaw pinion 80 causes a rotation of nacelle 16 about yaw axis 36. Yaw slip assembly 82 is coupled between yaw drive shaft 78 and yaw pinion 80 to facilitate transferring a predefined torque loading between yaw pinion 80 and yaw drive shaft 78.

During operation of yaw assembly 40, yaw drive motor 84 imparts a mechanical force to yaw gearbox 86, which in turn translates the force into rotational energy. Yaw gearbox 86 then rotates yaw drive shaft 78 about yaw drive axis 88. Yaw slip assembly 82 imparts a predefined torque loading between yaw pinion 80 and yaw drive shaft 78 to rotate yaw pinion 80 about yaw drive axis 88. As yaw pinion 80 rotates, yaw pinion 80 engages yaw bearing 38 and causes a rotation of nacelle 16 about yaw axis 36. As wind strikes rotor 22, a velocity of wind, represented by arrow 89, imparts a rotational moment, represented by arrow 90, to rotor 22 and to nacelle 16. A torque loading, represented by arrows 92, is imparted to yaw pinion 80 from rotational moment 90. As wind velocity 89 increases, torque loading 92 increases. When torque loading 92 is equal to, or less than, the predefined torque loading, yaw slip assembly 82 prevents a rotation of yaw pinion 80 relative to yaw drive shaft 78, such that yaw assembly 40 may prevent a rotation of nacelle 16 to facilitate maintaining a position of rotor 22 with respect to wind direction 30 (shown in FIG. 1). When torque loading 92 exceeds the predefined torque loading, yaw slip assembly 82 enables yaw pinion 80 to rotate relative to yaw drive shaft 78 such that nacelle 16 rotates relative to tower 12.

Figure 4:
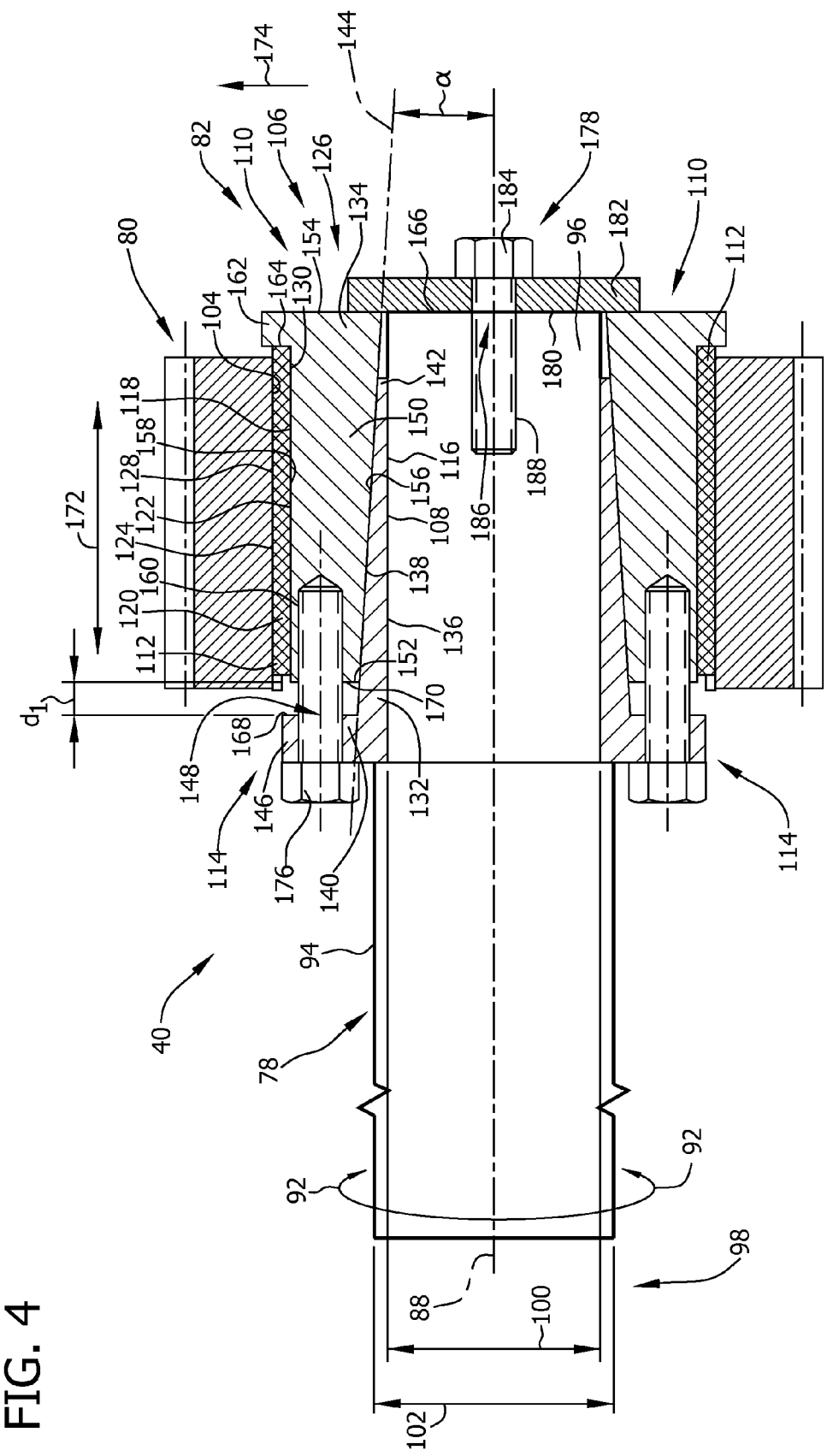
FIG. 4 is a partial cross-sectional view of an exemplary yaw assembly suitable for use with the wind turbine shown in FIG. 1.

FIG. 4 is a cross-sectional view of a portion of yaw assembly 40 along sectional line 4-4 in FIG. 3. Identical components shown in FIG. 4 are labeled with the same reference numbers used in FIG. 2 and FIG. 3. In the exemplary embodiment, yaw assembly 40 includes yaw slip assembly 82 coupled between yaw pinion 80 and yaw drive shaft 78. Yaw drive shaft 78 has a shaft body 94 that extends between a shaft head 96 and a shaft end 98 and defines a yaw drive axis 88. Shaft end 98 is rotatably coupled to yaw drive system 76 such that yaw drive shaft 78 is rotatable about yaw drive axis 88. Shaft head 96 extends outwardly from shaft body 94 along yaw drive axis 88. In the exemplary embodiment, shaft head 96 has a first width 100. Shaft body 94 has a second width 102 that is greater than first width 100. Alternatively, first width 100 is equal to or greater than second width 102. In the exemplary embodiment, shaft head 96 has a substantially rectangular cross-sectional area. Alternatively, shaft head 96 may have a substantially cylindrical cross-sectional shape, or any suitable cross-sectional shape that enables yaw assembly 40 to function as described herein.

In the exemplary embodiment, yaw pinion 80 has an inner surface 104 that defines a pinion bore 106. Pinion bore 106 is sized to receive shaft head 96 therein. Yaw slip assembly 82 is positioned within pinion bore 106 and is between shaft head 96 and inner surface 104. More specifically, yaw slip assembly 82 is positioned within pinion bore 106 such that yaw slip assembly 82 is in contact with an outer surface 108 of shaft head 96 and inner surface 104 of yaw pinion 80.

In the exemplary embodiment, yaw slip assembly 82 includes at least one torque limit assembly 110, at least one bushing 112, and at least one adjustment assembly 114 coupled to torque limit assembly 110. Torque limit assembly 110 includes a radially inner surface 116 and a radially outer surface 118. Torque limit assembly 110 is coupled to shaft head 96 such that radially inner surface 116 is in contact with outer surface 108 of shaft head 96. In one embodiment, torque limit assembly 110 is coupled to shaft head 96 with a keypress fit. In the exemplary embodiment, bushing 112 includes a sidewall 120 that extends between an inner surface 122 and an outer surface 124. Sidewall 120 is substantially cylindrical such that inner surface 122 defines a bore 126 that is sized to receive shaft head 96 and torque limit assembly 110. In one embodiment, bushing 112 includes a plurality of sidewalls 120 that each partially circumscribes shaft head 96. In such an embodiment, each sidewall 120 is positioned between yaw pinion 80 and a respective torque limit assembly 110. In the exemplary embodiment, outer surface 124 is positioned adjacent yaw pinion 80 and is in contact with pinion inner surface 104 to form a first friction-fit joint 128 between bushing 112 and yaw pinion 80. Inner surface 122 is positioned adjacent torque limit assembly 110 to form a second friction-fit joint 130 between inner surface 122 and radially outer surface 118.

Torque limit assembly 110 includes a radially inner member 132 and a radially outer member 134. In the exemplary embodiment, radially inner member 132 is movable with respect to radially outer member 134 along yaw drive axis 88. Radially inner member 132 is positioned adjacent outer surface 108 of shaft head 96. Radially outer member 134 is positioned between radially inner member 132 and bushing 112. Radially inner member 132 and radially outer member 134 each has a wedge shape. Radially inner member 132 has an inner sidewall 136 and an outer sidewall 138. Inner sidewall 136 defines radially inner surface 116. Inner sidewall 136 and outer sidewall 138 each extend between a first end 140 and a second end 142 of radially inner member 132. Inner sidewall 136 is substantially planar and is positioned adjacent outer surface 108 of shaft head 96. Outer sidewall 138 is oriented obliquely with respect to yaw drive axis 88 along a plane 144 defining an angle α with respect to yaw drive axis 88. A flange 146 extends radially outwardly from first end 140 towards yaw pinion 80, and defines an opening 148 sized to receive adjustment assembly 114 therethrough.

Radially outer member 134 includes a body 150 that extends between a first end wall 152 and a second end wall 154. Body 150 includes an inner surface 156 and an outer surface 158. Outer surface 158 at least partially defines radially outer surface 118. Inner surface 156 is oriented obliquely with respect to yaw drive axis 88 and is positioned adjacent outer sidewall 138 along plane 144. First end wall 152 defines a bore 160 that is sized to receive at least a portion of adjustment assembly 114 therein. Second end wall 154 includes a support flange 162 that extends radially outwardly from second end wall 154 towards yaw pinion 80. Support flange 162 has a first or upper surface 164 that contacts bushing 112 to facilitate preventing an axial movement of bushing 112 with respect to yaw drive axis 88.

In the exemplary embodiment, radially outer member 134 is positioned nearer to an end wall 166 of shaft head 96 than radially inner member 132. Moreover, radially inner member 132 is positioned with respect to radially outer member 134 such that an axial distance $d_1$ is defined between an inner surface 168 of flange 146 and an outer surface 170 of first end wall 152 as measured along yaw drive axis 88. Adjustment assembly 114 is selectively actuatable to move radially inner member 132 in an axial direction 172 along yaw drive axis 88 to adjust distance $d_1$ between radially inner member 132 and radially outer member 134. As radially inner member 132 is moved axially towards radially outer member 134, radially inner member 132 biases radially outer member 134 outwardly towards yaw pinion 80 to urge bushing 112 towards yaw pinion 80 and to increase a friction force, represented by arrow 174, at first friction-fit joint 128. As friction force 174 is increased, torque loading 92 transferred between yaw pinion 80 from yaw drive shaft 78 through yaw slip assembly 82 is increased. As adjustment assembly 114 moves radially inner member 132 axially away from radially outer member 134, the friction force at first friction-fit joint 128 is reduced, which in turn reduces an amount of torque loading 92 transferred between yaw pinion 80 and yaw drive shaft 78 through yaw slip assembly 82.

In the exemplary embodiment, adjustment assembly 114 includes a fastener 176 that is inserted through flange opening 148 and into bore 160. Fastener 176 is configured to position radially inner member 132 with respect to radially outer member 134 to adjust distance $d_1$. Moreover, fastener 176 is further configured to prevent a rotation about yaw drive axis 88 of radially inner member 132 with respect to radially outer member 134.

An end plate assembly 178 is coupled to end wall 166 of shaft head 96. End plate assembly 178 has a forward surface 180 that is positioned adjacent support flange 162 to facilitate preventing an axial movement of radially outer member 134. In the exemplary embodiment, end plate assembly 178 includes a plate 182 coupled to shaft head 96 with a fastener 184. Fastener 184 extends through an opening 186 defined in plate 182 and into a bore 188 defined in shaft head 96.

Figure 5:
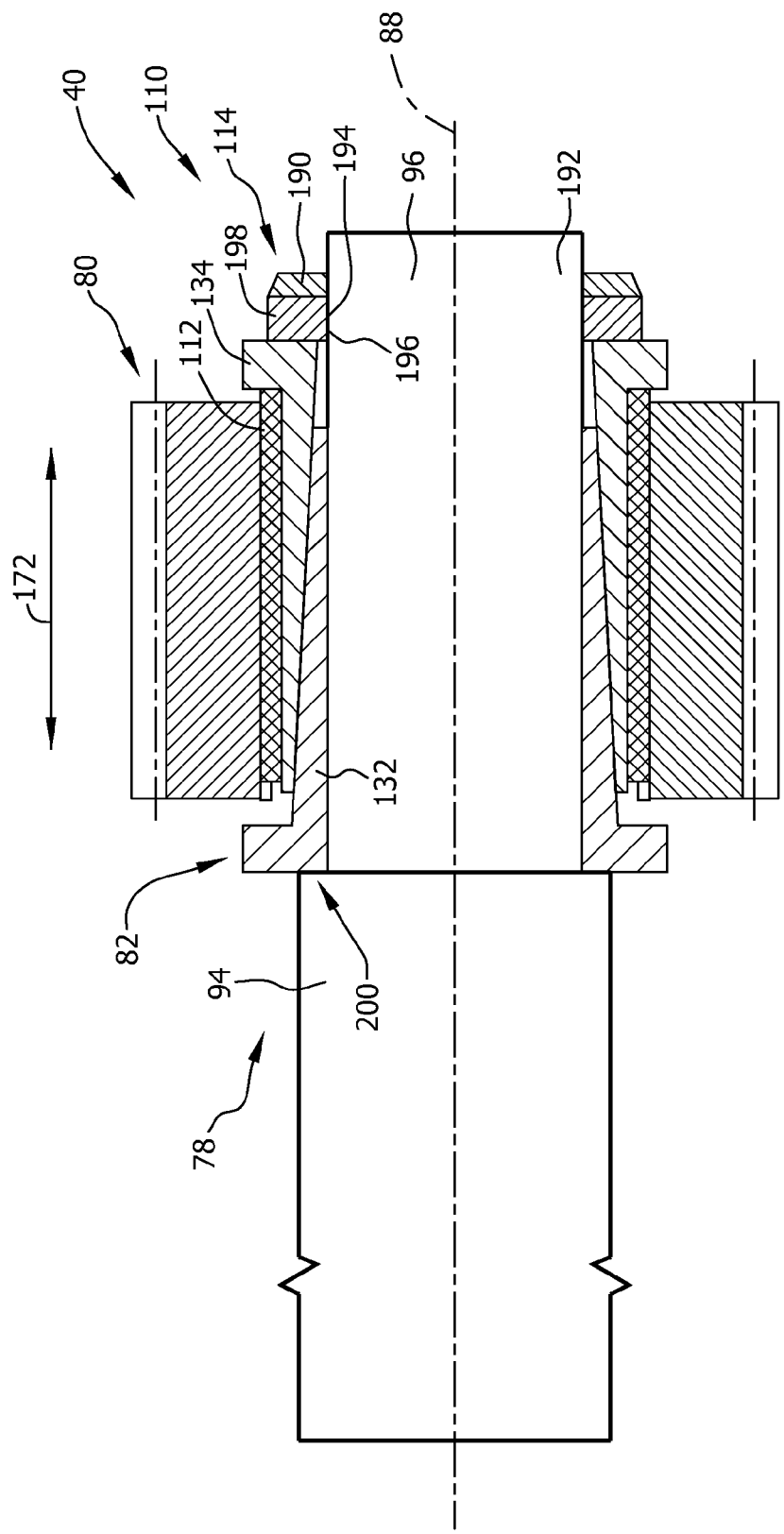
FIGS. 5-7 are partial cross-sectional views of alternative yaw assemblies suitable for use with the wind turbine shown in FIG. 1.
Figure 6:
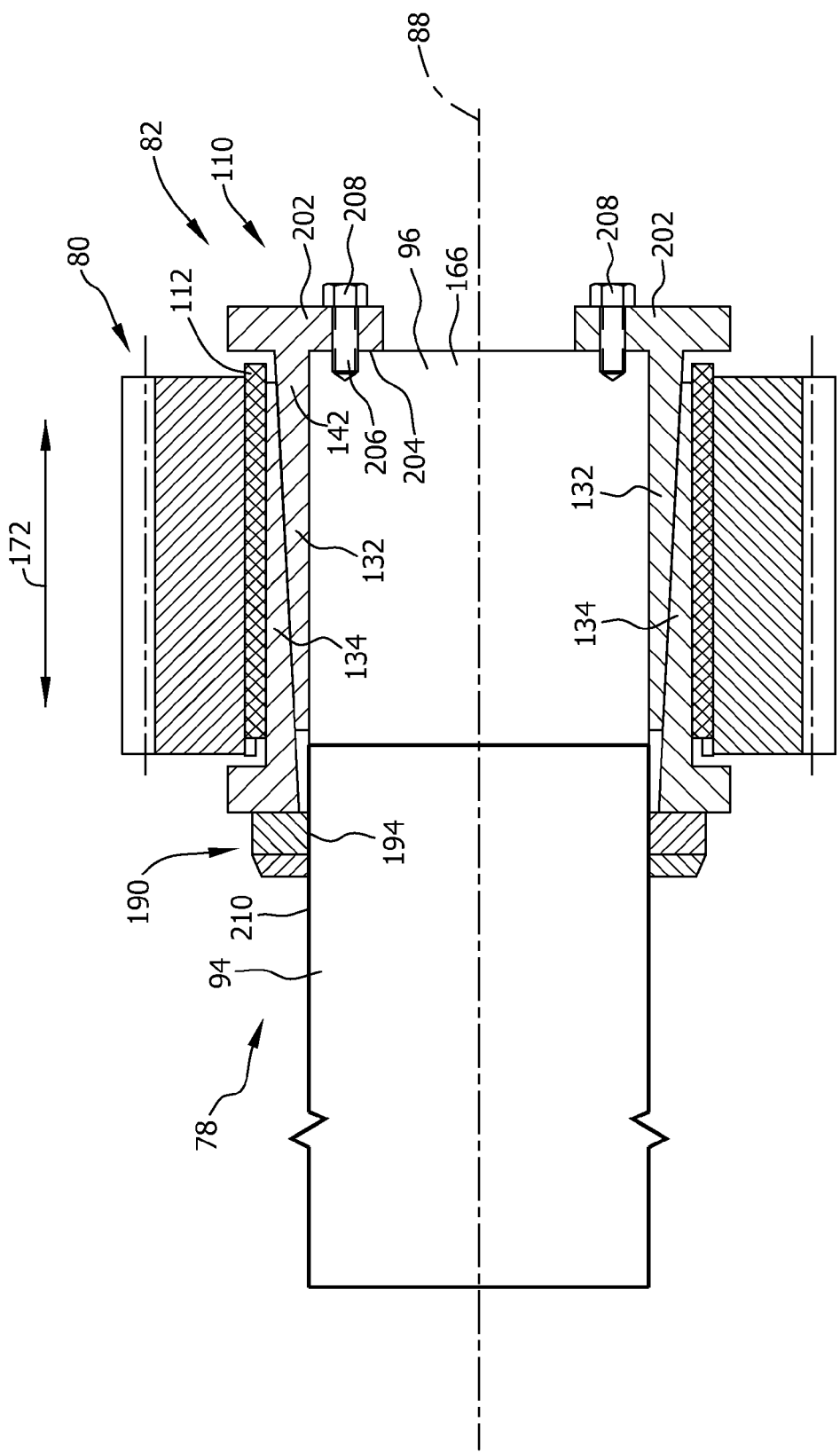
Figure 7:
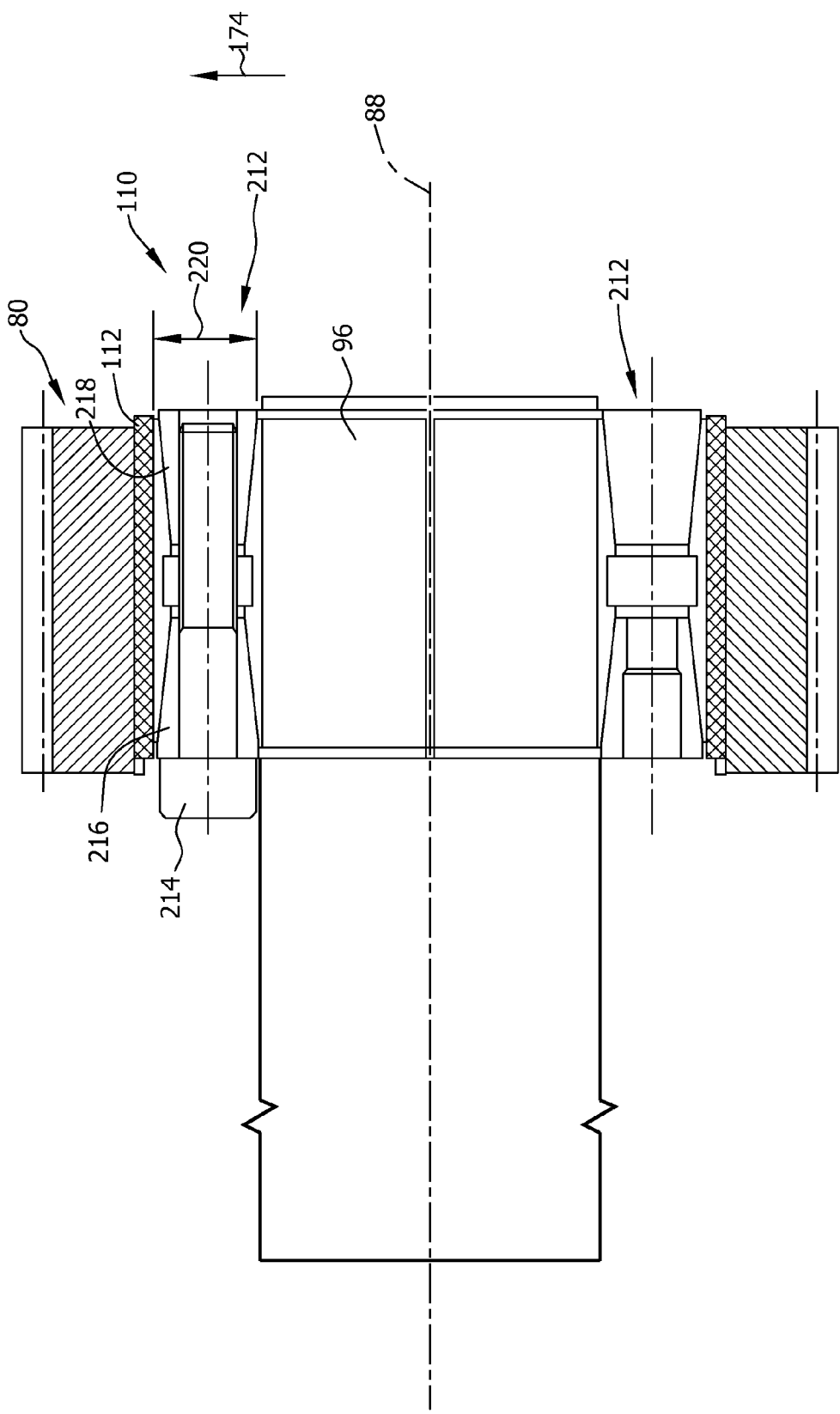

FIGS. 5-7 are partial cross-sectional views of alternative embodiments of yaw assembly 40. Identical components shown in FIGS. 5-7 are labeled with the same reference numbers used in FIG. 2 and FIG. 3. Referring to FIG. 5, in an alternative embodiment, adjustment assembly 114 includes a ring-nut assembly 190 coupled to an end portion 192 of shaft head 96. Ring-nut assembly 190 is configured to adjust an axial position of radially outer member 134 with respect to radially inner member 132. Ring-nut assembly 190 has a threaded inner surface 194, and end portion 192 has a threaded outer surface 196 that is configured to engage threaded inner surface 194. Ring-nut assembly 190 further includes a sidewall 198 that is positioned adjacent to radially outer member 134 such that a rotation of ring-nut assembly 190 moves radially outer member 134 in axial direction 172. Yaw drive shaft 78 defines a shoulder 200 between shaft body 94 and shaft head 96. Radially inner member 132 is positioned adjacent shoulder 200 to facilitate preventing an axial movement of radially inner member 132 in axial direction 172.

Referring to FIG. 6, in an alternative embodiment, radially inner member 132 is positioned closer to shaft end wall 166 than radially outer member 134. Radially inner member 132 includes a flange 202 that extends inwardly from second end 142 towards yaw drive shaft 78. Flange 202 has a support surface 204 that is positioned adjacent end wall 166. Flange 202 defines an opening 206 that is sized to receive a fastener 208 that is configured to couple radially inner member 132 to end wall 166 to facilitate limiting an axial movement of radially inner member 132. Ring-nut assembly 190 is coupled to shaft body 94 and is positioned adjacent radially outer member 134 such that a rotation of ring-nut assembly 190 moves radially outer member 134 in axial direction 172 with respect to radially inner member 132. Shaft body 94 has a threaded outer surface 210 that is configured to engage threaded inner surface 194 of ring-nut assembly 190.

Referring to FIG. 7, in a further alternative embodiment, torque limit assembly 110 includes a locking assembly 212 positioned between shaft head 96 and yaw pinion 80. Locking assembly 212 includes a torque bolt 214 coupled between a first member 216 and a second member 218. First member 216 and second member 218 each has a wedge-shaped cross-section. During operation, a rotation of torque bolt 214 in a first rotational direction causes first member 216 and second member 218 to move axially towards each other such that a width 220 of locking assembly 212 increases. As width 220 increases, locking assembly 212 urges bushing 112 towards yaw pinion 80 causing an increase in friction force 174. Moreover, a rotation of torque bolt 214 in an opposite second rotational direction causes first member 216 and second member 218 to move axially away from each other, such that width 220 is decreased to reduce friction force 174.

The above-described system and apparatus facilitate selectively transferring a torque loading from a nacelle to a yaw system. More specifically, the yaw system described herein includes a slip assembly that enables an adjustment of the torque loading that is transferred between a yaw pinion and a yaw drive shaft to enable the yaw pinion to rotate with respect to the yaw drive shaft when an operating torque loading exceeds a predefined torque loading. The ability to limit an amount of torque loading transferred between the yaw pinion and the yaw drive shaft facilitates reducing the size of a yaw drive system required to operate the yaw system. As such, the cost required to operate the yaw system is significantly reduced.

Exemplary embodiments of systems and apparatus for a yaw assembly for use in wind turbines are described above in detail. The systems and apparatus are not limited to the specific embodiments described herein, but rather, components of systems and/or apparatus may be utilized independently and separately from other components and/or steps described herein. For example, the systems may also be used in combination with other rotating systems, and are not limited to practice with only the yaw system as described herein. Rather, the exemplary embodiment can be implemented and utilized in connection with many other rotating system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A yaw assembly for use in a wind turbine, said yaw assembly comprising:
    a shaft coupled to a yaw drive assembly, said shaft extending outwardly from said yaw drive assembly;
    a pinion operatively coupled to said shaft; and,
    a slip assembly positioned between said pinion and said shaft, said slip assembly comprising a torque limit assembly positioned adjacent an outer surface of said shaft and a bushing positioned between said torque limit assembly and said pinion, said slip assembly configured to facilitate selectively rotating said pinion with respect to said shaft.

2. A yaw assembly in accordance with claim 1, wherein said pinion defines a pinion bore sized to receive said shaft and said slip assembly.

3. A yaw assembly in accordance with claim 1, wherein said torque limit assembly comprises:
    at least one radially inner member positioned adjacent said outer surface; and,
    at least one radially outer member positioned between said radially inner member and said bushing.

4. A yaw assembly in accordance with claim 3, wherein said torque limit assembly further comprises an adjustment assembly coupled to said radially inner member and said radially outer member, said adjustment member selectively actuatable to move the radially inner member with respect to the radially outer member.

5. A yaw assembly in accordance with claim 4, wherein said torque limit assembly further comprises an end plate coupled to said radially outer member and to an end surface of said shaft, said end plate configured to facilitate preventing movement of said radially outer member with respect to an axis of said shaft.

6. A yaw assembly in accordance with claim 3, wherein said torque limit assembly further comprises a ring-nut assembly coupled to said shaft.

7. A yaw assembly in accordance with claim 6, wherein said radially outer member is movable with respect to said radially inner member, and said ring-nut assembly is configured to position said radially outer member along a longitudinal axis defined by said shaft.

8. A yaw system for use with a wind turbine, the wind turbine including a nacelle coupled to a tower, said yaw system comprising:
    a yaw bearing coupled between the nacelle and the tower;
    a yaw drive assembly coupled to the nacelle;
    a shaft coupled to said yaw drive assembly, said shaft extending outwardly from said yaw drive assembly;
    a pinion operatively coupled to said shaft, said pinion configured to engage said yaw bearing; and,
    a slip assembly positioned between said pinion and said shaft, said slip assembly comprising a torque limit assembly positioned adjacent an outer surface of said shaft and a bushing positioned between said torque limit assembly and said pinion, said slip assembly configured to selectively transfer a torque loading from said yaw drive assembly to said pinion.

9. A yaw system in accordance with claim 8, wherein said torque limit assembly further comprises:
   at least one radially inner member positioned adjacent said outer surface; and,
   at least one radially outer member positioned between said radially inner member and said bushing.

10. A yaw system in accordance with claim 9, wherein said torque limit assembly further comprises an adjustment assembly coupled to said radially inner member and said radially outer member, wherein said adjustment assembly is actuatable to move said radially inner member with respect to said radially outer member and said shaft.

11. A yaw system in accordance with claim 10, wherein said torque limit assembly further comprises an end plate coupled to said radially outer member and to an end surface of said shaft, said end plate configured to facilitate preventing movement of said radially outer member with respect to an axis of said shaft.

12. A yaw system in accordance with claim 11, wherein said radially outer member is movable with respect to said radially inner member, said torque limit assembly further comprises a ring-nut assembly rotatably coupled to said shaft, said ring-nut assembly configured to position said radially outer member along a longitudinal axis defined by said shaft.

13. A wind turbine system, comprising:
   a tower;
   a nacelle rotatably coupled to said tower;
   a yaw bearing coupled between said nacelle and said tower;
   a yaw drive assembly coupled to said nacelle;
   a shaft coupled to said yaw drive assembly, said shaft extending outwardly from said yaw drive assembly;
   a pinion operatively coupled to said shaft, said pinion configured to engage said yaw bearing; and,
   a slip assembly positioned between said pinion and said shaft, said slip assembly comprising a torque limit assembly positioned adjacent an outer surface of said shaft and a bushing positioned between said torque limit assembly and said pinion, said slip assembly configured to facilitate selectively rotating said pinion with respect to said shaft.

14. A wind turbine system in accordance with claim 13, wherein said torque limit assembly further comprises:
   at least one radially inner member positioned adjacent said outer surface; and,
   at least one radially outer member positioned between said radially inner member and said bushing.

15. A wind turbine system in accordance with claim 14, wherein said radially outer member is movable with respect to said radially inner member, said torque limit assembly further comprises a ring-nut assembly rotatably coupled to said shaft, said ring-nut assembly configured to position said radially outer member along a longitudinal axis defined by said shaft.

16. A wind turbine system in accordance with claim 14, wherein said torque limit assembly further comprises an adjustment assembly coupled to said radially inner member and said radially outer member, wherein said adjustment assembly is actuatable to move said radially inner member with respect to said radially outer member and said shaft.

17. A wind turbine system in accordance with claim 16, wherein said torque limit assembly further comprises an end plate coupled to said radially outer member and to an end surface of said shaft, said end plate configured to facilitate preventing movement of said radially outer member with respect to an axis of said shaft.

\* \* \* \* \*